United States Patent
Wiese et al.

(10) Patent No.: US 6,280,593 B1
(45) Date of Patent: Aug. 28, 2001

(54) PROCESS FOR SEPARATING OFF ORGANIC ACIDS FROM AQUEOUS SOLUTIONS

(75) Inventors: Klaus-Diether Wiese, Haltern; Antje Jakob, Verden/Aller; Franz-Felix Kuppinger, Marl, all of (DE)

(73) Assignee: Degussa-Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/429,899

(22) Filed: Oct. 29, 1999

(30) Foreign Application Priority Data

Oct. 29, 1998 (DE) ............................................. 198 49 924

(51) Int. Cl.[7] .................................................. B01D 61/44
(52) U.S. Cl. ........................................... 204/530; 204/538
(58) Field of Search ...................................... 204/530, 538

(56) References Cited

U.S. PATENT DOCUMENTS

| | | |
|---|---|---|
| 4,781,809 | 11/1988 | Falconi, Jr. . |
| 5,814,498 | 9/1998 | Mani et al. . |

FOREIGN PATENT DOCUMENTS

| | | |
|---|---|---|
| 0 838 435 | 4/1998 | (EP) . |
| 1 128 904 | 1/1957 | (FR) . |
| 787 977 | 12/1957 | (GB) . |
| WO 92/11080 | 7/1992 | (WO) . |

*Primary Examiner*—Arun S. Phasge
(74) *Attorney, Agent, or Firm*—Oblon, Spivak, McClelland, Maier & Neustadt, P.C.

(57) ABSTRACT

The present invention relates to a process for separating organic acids from aqueous solutions by the use of electrochemical processes such as electrolysis and electrodialysis. These processes can be used, for example, to purify aqueous solutions produced in aldol condensation processes.

19 Claims, 4 Drawing Sheets

PROCESS FOR SEPARATING OFF ORGANIC ACIDS FROM AQUEOUS SOLUTIONS

BACKGROUND OF THE INVENTION

FIELD OF THE INVENTION

The present invention relates to a process for separating organic acids from aqueous solutions. In particular, the invention relates to a process for purifying the process water in aldol condensation reactions.

Carboxylic acids are formed as byproducts in many base-catalyzed condensation reactions of organic compounds, in particular in the reaction of aldehydes. For example, the condensation of n-butyraldehyde to form ethylhex-2-enal and water is a process of great industrial importance. In this process, the reaction mixture is usually worked up as follows: in the first step, the product-containing organic phase is separated from the aqueous phase (catalyst solution and reaction water) in a settling tank. Owing to the polarity of the organic acids formed in the side reactions and the base used as catalyst, these two components are principally present in the aqueous phase. Direct feeding of this aqueous phase to the effluent treatment plant is therefore usually undesirable, owing to the high loading with bases and organic constituents. In addition, on account of the injection of the base with the aqueous phase from the process, to ensure a constant catalyst concentration, fresh base must constantly be fed to process, which is cost-intensive.

WO 92107648 discloses a process for the recovery of sodium hydroxide solution from aldol condensation process waters. Cation-exchange membranes are used in this process, the object of which is to treat the aqueous phases arising in the aldol condensation. In addition to the basic catalyst, the aqueous phase in this process also comprises the metal salts of the organic acid and alcohol formed as byproducts. This solution is conducted through the anode chamber into a two-chamber membrane electrolysis cell. When an electric field is applied, the metal cations migrate into the cathode chamber and react with the hydroxide ions formed at the cathode to give the metal hydroxide. In the anode circuit, an aqueous solution remains which comprises predominantly only the organic acids and alcohol. Disposal of this solution is complex, since the organic constituents are only present at low concentrations, and the solution cannot thus be fed directly to thermal waste disposal. Recovery of the organic acids present in low concentrations is also not worthwhile.

DE 196 04 903 discloses a similar process for separating an alkali solution from the product arising in the aldol condensation, which process operates according to the principle of three-chamber electrolysis or three-chamber electrodialysis. In this process, the product-containing phase, after removal of an aqueous phase, is conducted through the central chamber of the electrolysis cell which is bounded by an anion-exchange membrane and a cation-exchange membrane. In the case where the catalyst is a sodium hydroxide solution, the $Na^+$ ions migrate through the cation-exchange membrane in the electric field, and form a sodium hydroxide solution in the cathode chamber, with the $OH^-$ ions produced at the cathode. The $OH^-$ ions present in the central chamber migrate through the anion-exchange membrane into the anode chamber and react with the $H^+$ ions produced at the anode to form water. In this process for separating alkali solution, the base is removed from the product, but the basic and organic constituents present in the aqueous phase are not worked up.

In both of the above-mentioned processes, the phase to be treated, during the course of the electrolysis or electrodialysis, is depleted in dissolved metal hydroxide, and the conductivity of the solution decreases with advancing electrolysis or electrodialysis. This means that an ever increasing power input is necessary to separate constituents still present in the phase to be treated.

Another known method for treating aqueous solutions comprising organic constituents is acidifying the aqueous solution until phase separation results. However, in this case only the high boilers are removed from the solution, and the organic acids remain in the aqueous phase. In addition, there is further salting of the mass stream of the aqueous solution, which makes disposal still more difficult.

Therefore, the object underlying the invention is to provide a simple process for separating organic acids from aqueous solutions or aqueous waste streams which, in particular, facilitates the workup of aqueous phases separated from aldol condensation reactions.

SUMMARY OF THE INVENTION

Surprisingly, it has been found that separating organic acids from aqueous solutions is considerably simplified by the use of electrochemical processes. The present invention therefore relates to a process for separating organic acids from aqueous solutions, which comprises separating the organic acids from the solution to be treated by electrochemical processes.

DETAILED DESCRIPTION OF THE INVENTION

Figure 1:
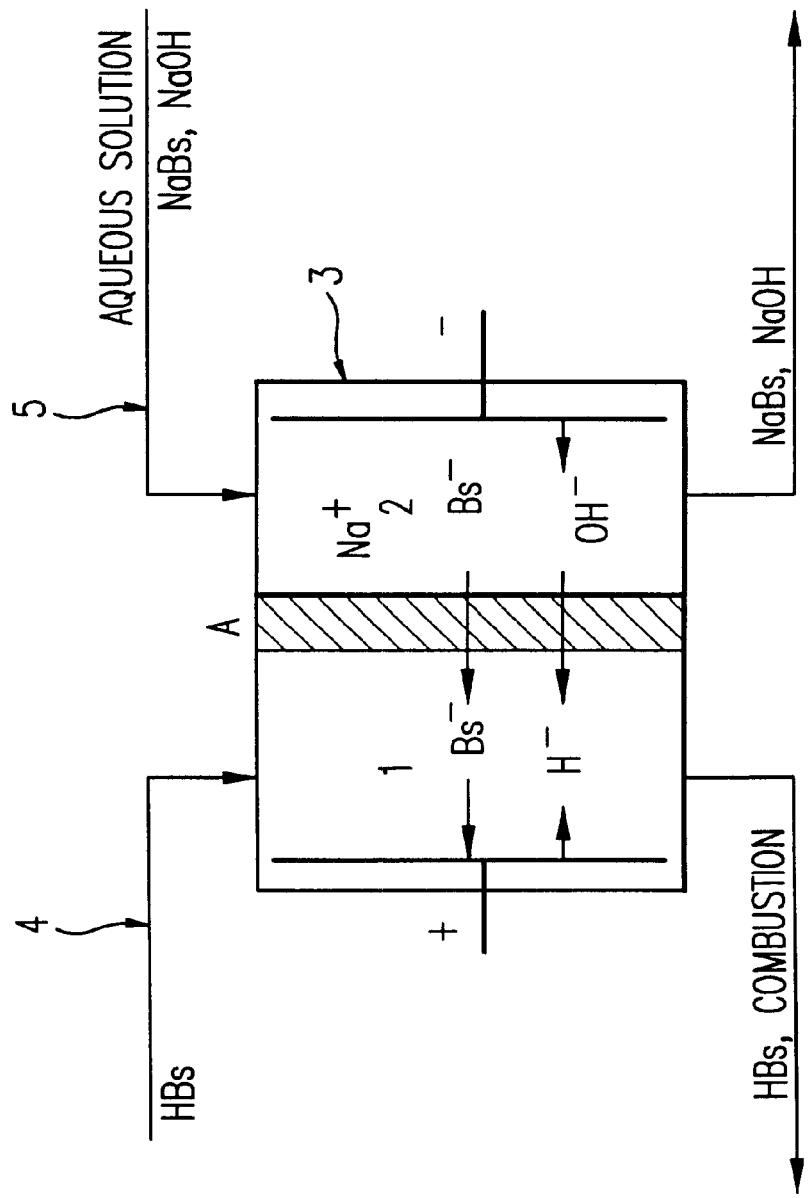
FIG. 1 is a schematic view of the electrolysis process.

Using the process according to the invention, all aqueous solutions of organic acids can be treated independently of their origin, but in particular those which are produced in aldol condensation reactions.

In base-catalyzed aldol condensations, the reaction mechanism shows that 1 mole of water is formed per 2 moles of aldehyde or ketone used. In addition, the base is added to the reaction as an aqueous solution. After the reaction, an organic phase and an aqueous phase are present. Generally, phase separation using a phase separator is used to separate the desired product. The organic phase principally comprises the desired product, whereas the aqueous phase comprises the catalyst used and organic constituents which frequently arise in side reactions of the aldol condensation. In particular, for example, the Cannizarro Reaction is a disproportionation reaction of the aldehydes or ketones. In this reaction, two molecules of aldehyde or ketone produce one molecule of carboxylic acid and one molecule of alcohol, whose carbon chain length depends on that of the aldehyde or ketone used. According to the invention, the organic acids are readily water-soluble up to a chain length of 4 to 5 carbon atoms, so that they principally remain in the aqueous phase in the phase separation.

In aldol condensation reactions, the a-carbon of one aldehyde or ketone molecule adds to the carbonyl carbon of another, under base catalyzed conditions. The product of the reaction is typically a hydroxy aldehyde or ketone, or an unsaturated aldehyde or ketone. The chemistry of the aldol condensation reaction is described in detail in *Advanced Organic Chemistry*, 3$^{rd}$ Edition, by J. March, pp. 829–834, John Wiley & Sons, NY, 1985, and is herewith incorporated by reference.

According to the invention, the organic acids are separated from aqueous solutions by two variants of the electrochemical process, electrolysis and electrodialysis. In the two variants, preferably, some of the water is taken from the mass stream by generally known processes, preferably by a flash evaporation, before the electrochemical process according to the invention is carried out. This water is virtually free of inorganic and organic pollutants and can thus be fed directly to further use or disposal. However, a partial stream of the aqueous phase can also be withdrawn and treated directly.

In the electrolytic variant, the separation is achieved by introducing the aqueous solution to be treated into the cathode chamber of an electrolysis module. This is equipped, according to the invention, with at least one commercial anion-exchange membrane, such as the AHA-2 from Tokuyama Soda Ltd., which separates the cathode chamber from the anode chamber.

The cathode chamber is preferably incorporated into a reservoir circuit into which the solution to be treated is introduced. For example, the anode chamber, into which the organic acid is introduced, preferably the acid already present in the solution to be treated, is connected into a circuit containing at least one reservoir. Flow passes through the cathode chamber or counter-currently, preferably concurrently, with the anode chamber. However, flow can pass through the cathode chamber and anode chamber without, in each case, recirculation of the solution to be treated or the acid solution introduced.

In the anode chamber and the cathode chamber there is at least one electrode in each chamber, that is to say one anode and one cathode. The cathode consists of a material known to be used for electrolyses, preferably steel. According to the invention, the anode preferably consists of steel, platinum black, platinum, graphite, a mixture of metal oxides, or it consists of a combination of these constituents, pure or applied to, or incorporated in, a support material, preferably titanium.

Applying an electrical voltage produces an electric field between the electrodes. According to the invention, under the influence of the field, the cations, in the case of, for example, base-catalyzed preparation of octenal from butanal using sodium hydroxide solution as base, sodium ions migrate toward the cathode, and the anions, preferably anions of organic acids, but also OH$^-$ions, migrate through the anion-exchange membrane toward the anode. Hydroxide ions are produced at the cathode in the cathode chamber in accordance with the formula:

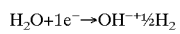
$$H_2O+1e^-\rightarrow OH^-+\tfrac{1}{2}H_2$$

The sodium ions react with the hydroxide ions produced at the electrode, to form a sodium hydroxide solution. H$^+$ions are produced at the anode in the anode chamber in accordance with the formula:

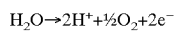
$$H_2O\rightarrow 2H^++\tfrac{1}{2}O_2+2e^-$$

The negatively charged acid residues which have migrated into the anode chamber react with the H$^+$ions to form the acid. By means of the above-mentioned processes, the organic acids are separated from the solution to be treated, and these organic acids accumulate in the anode chamber. The process is therefore outstandingly suitable for separating organic acids from aqueous solutions. In the case of base-catalyzed aldol condensation processes, the aqueous solution to be treated also contains bases, in addition to organic acids. In the cathode chamber, this solution can not only be depleted of organic acids by the above-mentioned process, but also be enriched with base. The base can be directly reused as a catalyst in the process, without needing to be disposed of.

If the solution to be treated originates from an aldol condensation process, and contains both a basic catalyst and organic acids, the ratio of acid to base in the aqueous solution is preferably varied to optimize the separation efficiency. By neutralizing the base in the aqueous solution by increasing the acid concentration, preferably with the organic acids which are already present in the solution to be treated, the proportion of acid anions in comparison with hydroxide anions increases. As a result, the organic acid can be transported through the anion-exchange membrane with higher selectivity, i.e. higher current efficiency. The electric current is therefore principally transported by the acid anions.

Likewise, to optimize the separation efficiency and to decrease the energy input necessary, a strong mineral acid, such as suliric acid, or, if present, a base, preferably the base already present in the solution to be treated, can be added to the organic acids introduced into the anode chamber order to increase the conductivity in this chamber. This is advisable, since the conductivity of the solution in the anode chamber is dependent on the ionic concentration. The ionic concentration is very low when a pure acid solution is introduced, since the ionic concentration is dependent on the dissociation constants of the organic acids introduced. By adding base, which is present in dissociated form in water and thus increases the ionic concentration of solution in the anode chamber, the conductivity in the anode chamber can matched to that in the cathode chamber, and as a result the energy input can be reduced.

According to the invention, two additional treatment effects can be achieved by setting a current density at from 100 to 1000 A/m$^2$. First, the Kolbe reaction at the anode can be exploited to split organic acids electrochemically into water-insoluble hydrocarbons by elimination of CO$_2$ (R is any organic radical), in accordance with the formulae:

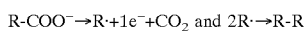
$$R\text{-}COO^-\rightarrow R\cdot+1e^-+CO_2 \text{ and } 2R\cdot\rightarrow R\text{-}R$$

Since the resulting hydrocarbons are mainly water-insoluble, these can be separated from the anode liquid, for example, by a phase separator downstream of the anode chamber and fed to disposal or further processing. By choosing the applied voltage in this process, it is therefore possible, depending on which organic acids are formed in the aldol condensation process, to decide whether principally the acid, or some of the acid, is to be further processed as hydrocarbon synthesized according to the formula given above.

Surprisingly, depending on the way the process is carried out, even neutral organic compounds are separated during the electrolysis of the aqueous solution. This effect is apparently based on induced convection flow in the membranes. Neutral organic compounds frequently occur as byproducts in aldol condensation reactions in the aqueous phase, in addition to bases and organic acids. Neutral organic compounds are any organic compounds which do not ionize in the aqueous solution. Owing to this effect, the neutral organic compounds migrate with the anions from the aqueous solution to be treated, from the cathode chamber into the anode chamber, through the anion-exchange membrane. In the anode chamber, the neutral organic compounds can likewise be separated by phase separation. The neutral organic compounds thus obtained can again be fed to disposal or fuirther processing.

The second variant of the process according to the invention is electrodialysis, which is preferably used when relatively large volumes of solutions are to be treated, or organic acids are to be separated from aqueous solutions in a relatively short time. For this purpose, the number of chambers in the electrolysis module is increased in such a manner, that between the outer chambers which receive the electrodes, which correspond to those in the electrolytic variant of the process according to the invention, anion exchange membranes and bipolar membranes are used alternately. Also, commercial membranes can be used. For example, the AHA-2 membrane from Tokuyama Soda Ltd. can be used as an anion-exchange membrane, and the bipolar membrane from Aqualytics can be used as a bipolar membrane.

The cathode chamber and the chambers receiving the solution to be treated are jointly or separately, preferably jointly, incorporated into a reservoir circuit into which the solution to be treated is introduced. Flow passes through the cathode chamber countercurrently or cocurrently, preferably cocurrently, to the stream of the chambers receiving the acid, the acid chambers. Flow likewise passes through the solution-containing chambers countercurrently or cocurrently, preferably cocurrently, to the stream in the chambers bearing the acid. The anode chamber and the other chambers receiving the acid are jointly or separately, preferably jointly, preferably likewise incorporated into a reservoir circuit into which acid is introduced. Flow passes through the anode chamber countercurrently or cocurrently, preferably cocurrently, to the stream in the chamber bearing the solution to be treated. Flow likewise passes through the acid chambers countercurrently or cocurrently, preferably cocurrently, to the stream in the chambers bearing the solution to be treated. As was the case with electrolysis, incorporating the chambers into circuits is not compulsory.

Applying an electrical voltage produces an electric field between the electrodes. For example, in the case of the base-catalyzed preparation of octenal from butanal using sodium hydroxide solution as base, under the effect of the field, the cations, in this case sodium ions, migrate toward the cathode through a bipolar membrane, according to the invention. The anions, preferably organic acid residues, but also OH⁻ions, migrate through the anion-exchange membrane toward the anode or toward a bipolar membrane. At the cathode in the cathode chamber, and at the bipolar membranes, in the solution circuit, the sodium ions form a sodium hydroxide solution with hydroxide ions, produced at the electrode in accordance with the formula:

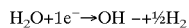

or at the bipolar membranes by splitting water into OH⁻and H⁺ions. At the anode or the bipolar membranes, the negatively charged acid residues which have migrated into the anode chamber or the acid chambers, form acid with the H⁺ions produced at the electrode in accordance with the formula:

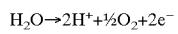

or at the bipolar membranes by splitting water into OH⁻and H⁺ions. By means of the above-mentioned mentioned processes, the organic acids are separated from the organic-acid-containing solution and these organic acids accumulate in the anode chamber and the acid chambers. The process is therefore outstandingly suitable for treating relatively large volumes of organic-acid-containing aqueous solutions. In the case of base-catalyzed aldol condensation processes, the aqueous solution to be treated in the cathode chamber or in the chambers bearing the solution to be treated also comprises bases, in addition to organic acids. This solution can be depleted in organic acids and enriched in base by the above-mentioned processes in the cathode chamber or in the chambers bearing the solution to be treated, and thus can be directly reused in the process as catalyst.

If the solution to be treated originates from aldol condensation processes, and if it thus comprises a basic catalyst as well as organic acids, the ratio of acid to base in the aqueous solution to be treated is preferably varied to optimize the separation efficiency. By neutralizing the base in the aqueous solution by increasing the acid concentration, preferably using the organic acids which are already present in the solution to be treated, the proportion of acid anions compared to the hydroxide anions increases. As a result, the organic acid can be transported through the anion-exchange membrane with higher selectivity, i.e. higher current efficiency. The electrical current is therefore principally transported by the acid anions.

Likewise, to optimize the separation efficiency and to decrease the energy input required, a base, preferably, if present, the base already present in the solution to be treated, can be added to the acid to increase the conductivity in the chambers in which acid is introduced. This is advisable, since the conductivity of the solution in the anode chamber and in the acid chambers is dependent on the ionic concentration. When the pure acid solution is introduced, the ionic concentration is very low, since it is dependent on the dissociation constant of the organic acid introduced. By adding the base, which is present in dissociated form in water, the ionic concentration of the solution in the anode chamber is increased. Consequently, the conductivity in the anode chamber or the acid chambers can be matched with that in the cathode chamber, or in the chambers containing the solution to be treated, and as a result the energy input can be reduced.

By setting a current density of from 100 to 1000 A/m² according to the invention, two additional treatment effects can be achieved. First, the Kolbe reaction at the anode can be utilized to split the organic acids electrochemically into water-insoluble hydrocarbons by eliminating $CO_2$, in accordance with the formulae:

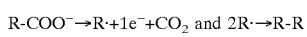

where R is any organic radical. Since the resulting hydrocarbons are chiefly water-insoluble, these can be separated from the anode liquid, for example, in a phase separator downstream of the anode chamber, and fed to disposal or further processing. By the choice of the applied voltage, there is thus in this process the possibility of deciding, depending on which organic acids are produced in the aldol condensation process, whether the acid or some of the acid is to be further processed as hydrocarbon, synthesized in according to the formula specified above. In the electrodialysis variant of the process according to the invention, only a small portion of the acid can be transformed into a hydrocarbon, since the Kolbe reaction only takes place directly at the anode.

The second effect which the process according to the invention can make use of, depending on the variant, is apparently based on an induced convection flow in the membranes. Surprisingly, even neutral organic compounds are separated from the aqueous solution to be treated during the electrolysis. In addition to bases and organic acids, these compounds are frequently obtained as aqueous phase byproducts in aldol condensation reactions. Owing to this effect, the neutral organic compounds migrate together with the anions through the anion-exchange membrane from the chamber which contains the aqueous solution to be treated, into the anode or acid chambers. The neutral organic compounds can likewise be separated by phase separation from the anode circuit or acid circuits. The neutral organic compounds thus obtained are again fed to disposal or further processing.

Preferably, the aqueous solution treated according to the invention is fed to an effluent treatment plant or to further processing. The organic constituents in the acid circuit which have been separated from the aqueous solution to be treated are concentrated and either fed directly to thermal disposal or further processed, e.g. separated into water-soluble and water-insoluble compounds by means of a phase separator and disposed of or further processed individually.

The processes according to the invention are preferably carried out at atmospheric pressure and at temperatures of 20, 30, 40, 50, 60, 70, 80, 90, 100, 110, 120, 130 and 140° C., inclusive of all values and subranges therebetween, preferably between 20° C. and 140° C., and particularly preferably from 30° C. to 60° C.

The electrolysis or electrodialysis processes according to the invention can be carried out as a continuous process or a batch process. A continuous process operates on a continuous flow (materials or time) basis, in contrast to batch processes, which operate as intermittent or sequenced operations. The strength of the electric field applied is dependent, inter alia, on apparatus conditions and on the material pairs present in the solution to be treated and should be of a level such that the effects according to the invention are achieved. The current density may be 50, 100, 150, 200, 250, 300, 350, 400, 450, 500, 550, 600, 650, 700, 750, 800, 850, 900, 950, and 1000 $A/m^2$, inclusive of all values and subranges therebetween. Preferably, a current density of from 50 to 1000 $A/m^2$ is set.

Additional, detailed descriptions of electrolysis and electrodialysis processes, describing various electrolysis and electrodialysis module designs and materials of construction, as well as anion and cation exchange membranes used in such processes, may be found in the Kirk-Othmer *Encyclopedia of Chemical Technology*, $4^{th}$ Edition, vol. 9, pp. 159–197, Wiley-Interscience, NY, 1994, which is herein incorporated by reference.

Anion-exchange membranes are typically polymeric films containing functional groups capable of selectively exchanging, binding or coordinating with anions. For example, anion-exchange membranes can be prepared from polyolefins, polystyrene, or perfluorinated polymers which contain quaternary ammonium groups. The polymer films may be crosslinked, or reinforced with other polymers. The anion-exchange membrane serves to prevent solutions in adjacent cells of an electrolysis or electrodialysis module from mixing, yet permits the selective transport of anions through the membrane toward the anode.

Bipolar membranes also comprise polymer films containing functional ionic groups. In contrast to anion-exchange membranes, bipolar membranes contain both functional groups capable of binding or coordinating anions and functional groups capable of binding or coordination cations. For example, quaternaty ammonium groups can be groups which bind or exchange anions, and sulfonate or carboxylate groups can be groups which bind or exchange cations. An example of a standard method for making bipolar membranes is to join a cation-exchange membrane and an anion-exchange membrane to each other appropriately. The bipolar membrane prevents mixing of solutions of two neighboring cells in electrodialysis modules. Uncharged molecules can penetrate into this membrane and be split into a positively charged and a negatively charged ion in the electric field. The positively charged ion can migrate through the cation-permeable part of the bipolar membrane into the one chamber, while the negatively charged ion can migrate through the anion-permeable part of the bipolar membrane into the other chamber. Passage of a positively or negatively charged ion through the bipolar membrane from one chamber to another is very largely prevented.

Figure 2:
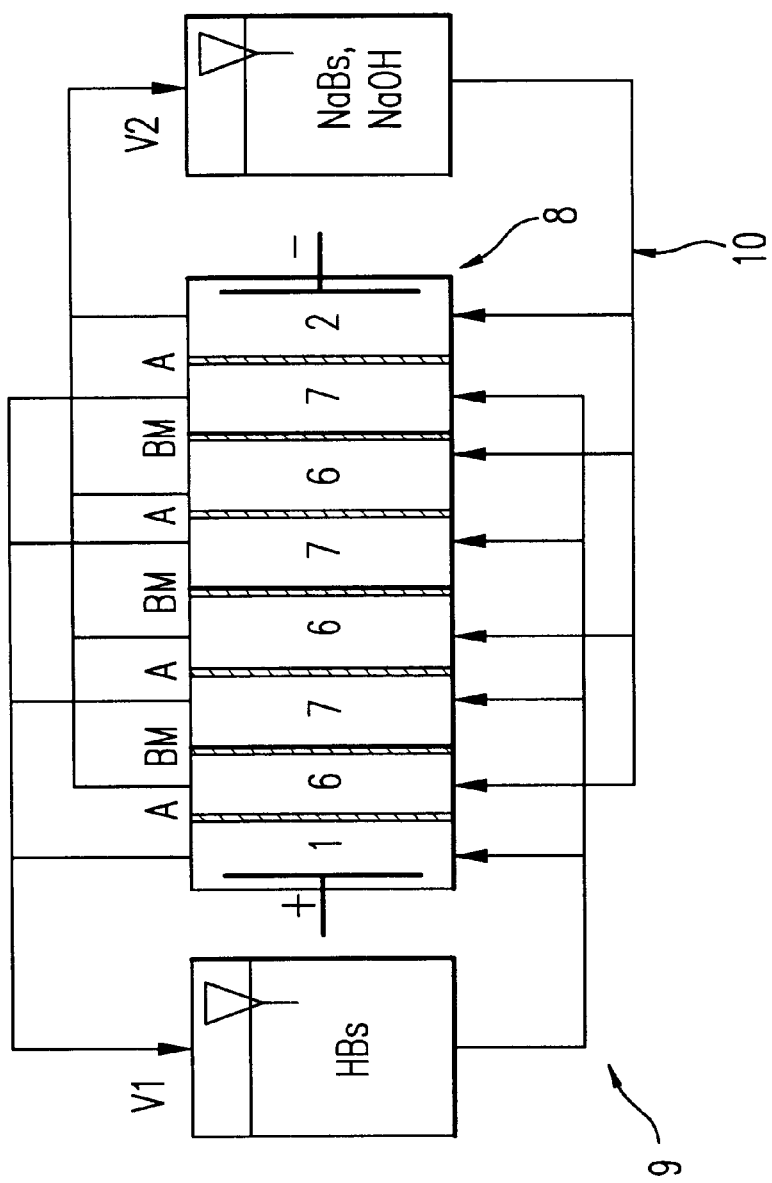
FIG. 2 is a schematic view of the electrodialysis process.

FIGS. 1 and 2 show by way of example two variants of the process according to the invention, without the process being restricted to these examples.

FIG. 1 shows an electrolysis variant of the process according to the invention. The electrolysis module 3, is divided by an anion-exchange membrane A into the two chambers 1 and 2. The anode chamber 1, in which the anode marked with "+" is disposed, is charged via circuit 4, for example, with a solution comprising butyric acid (HBs). The aqueous solution to be treated, in this example a wastewater stream which comprises NaOH and the sodium salt of butyric acid (NaBs), flows through the cathode chamber 2 in which is disposed the cathode marked by "−", via circuit 5. In the electric field, the $Na^+$ ions migrate to the cathode and there, together with the $OH^+$ ions formed, form sodium hydroxide solution. The $H^+$ ions produced at the anode (+) react with the anions $OH^-$ and $B^-$s which have migrated through the anion-exchange membrane A to form butyric acid and water.

An electrodialysis variant of the process according to the invention is shown in FIG. 2. The electrolysis module 8, is divided by four anion-exchange membranes A and three bipolar membranes BM into a cathode chamber 2, an anode chamber 1, three solution chambers 6 bearing the solution to be treated, and three receiving chambers 7 bearing a solution into which the acid impurities diffuse. A "solution chamber" is defined as a chamber of the electrodialysis module into which the solution to be electrochemically treated is introduced. A "receiving chamber" is a chamber of the electrodialysis module into which the impurities to be removed from the solution to be treated diffuse. A butyric acid (HBs) containing solution, which is introduced from reservoir V1, flows in this example in the circuit 9 cocurrently through the anode chamber 1 which is marked by "+". The receiving chambers 7 are likewise charged cocurrently with the solution introduced in the reservoir V1 by circuit 9. The solutions of the anode chamber 1 and the receiving chambers 7 combine after flowing through the electrolysis module and are collected in a reservoir V1. From this reservoir, the solution is fed to the chambers, the solution being divided among chambers 1 and 7. The cathode chamber 2, in which the cathode marked by "−" is located, is charged cocurrently by the solution to be treated, which comprises, in this case, NaOH and NaBs, which is introduced from the reservoir V2 through circuit 10. The solution chambers 6 containing the solution to be treated are likewise charged cocurrently with the solution introduced in the reservoir V2. The solutions of the cathode chamber 2 and the solution chambers 6 containing the solutions to be treated are combined after flowing through the electrodialysis module and are collected in the reservoir V2. In the electric field, the Na+ ions in the cathode chamber 2 and solution chambers 6 migrate to the cathode or to the bipolar membranes BM and there, with the OH⁻ions formed at the cathode (−) or the bipolar membrane BM, form sodium hydroxide solution. The H⁺ions formed at the anode (+) or at the bipolar membranes BM, react with the OH⁻and B⁻s anions which have migrated through the anion-exchange membrane A from the cathode chamber 2 or solution chambers 6 into anode chamber 1 or the receiving chambers 7, to form organic acid and water.

Having generally described this invention, a further understanding can be obtained by reference to certain specific examples which are provided herein for purposes of illustration only and are not intended to be limiting unless otherwise specified. The process according to the invention is described in more detail by the following examples, without being restricted thereto. In the examples, the process is illustrated on the basis of electrolysis, since this is also the basis of the electrodialysis variant and other variants.

EXAMPLES

Example 1

Cleaning up the Reaction Water from a Methylbutanal Aldol Condensation

In a two-chamber electrolysis module, whose chambers are separated by an anion-exchange membrane of AMA-2 from Tokuyama Soda Ltd., an electrolysis was carried out at a current density of 350 A/m² using an anode of titanium with mixed oxide having a surface area of 100 cm², and a cathode of expanded stainless steel metal having a surface area of 100 cm². The distance of the electrodes from the membrane was 2.5 mm and the membrane area was 100 cm². In the anode circuit, a preconcentrated methylbutyric acid solution, to which 1% by weight of the sodium hydroxide solution had been added to increase conductivity, was introduced; in the cathode circuit, the reaction water from a methylbutanal aldol condensation, which comprises sodium hydroxide solution and methylbutyric acid, was introduced. The conductivities of these solutions in all chambers were determined using a measuring apparatus from WTW during the entire electrodialysis operation.

Figure 3:
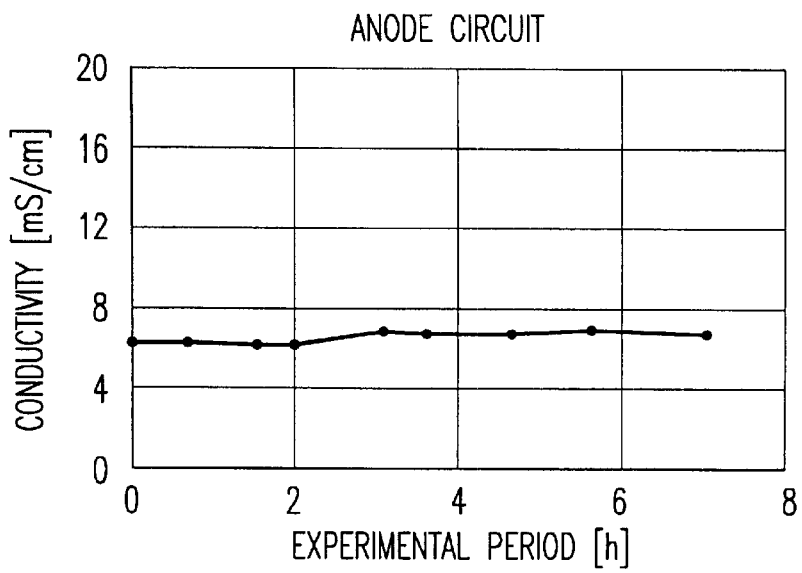
FIG. 3 is a plot of conductivity versus time in the anode chamber of Example 1.
Figure 4:
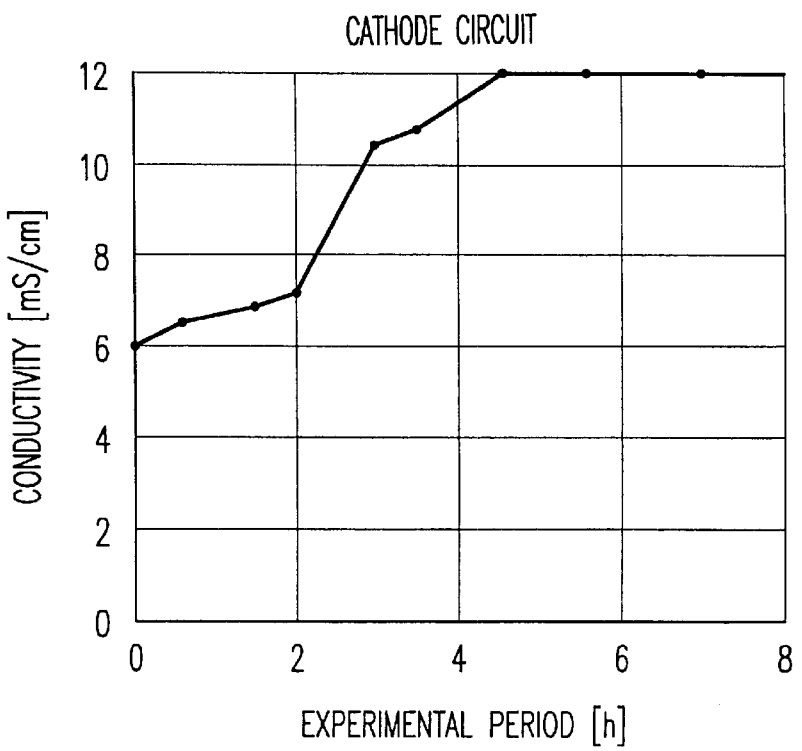
FIG. 4 is a plot of conductivity versus time in the cathode chamber of Example 1.

In the course of electrolysis, the conductivity in the reaction water circuit increased to a maximum value of 13 mS/cm. In the anode circuit, the conductivity remains virtually constant. FIG. 3 shows the time course of conductivity in the anode chamber. The conductivity of the anode chamber remains relatively constant over the duration of the experimental period. FIG. 4 shows the time course of conductivity in the cathode chamber. The conductivity of the cathode chamber increases to a maximum level over the duration of the experimental period.

Example 2

Cleaning up the Reaction Water from an Octenal Preparation

In a two-chamber electrolysis module as specified in Example 1, with the same equipment, three further electrolyses were carried out. Instead of methylbutyric acid, the reaction water used comprised butyric acid, which was generated during the preparation of octenal. In these experiments, in addition, the ratio of initial butyric acid concentration to hydroxide concentration was varied. For this purpose, in the second and third electrolysis, the concentration of butyric acid in the reaction water was increased by 0.3 or 0.6 moles/l by adding butyric acid. The conductivities of these solutions in all chambers were determined permanently using a measuring apparatus from WTW during the entire electrodialysis procedure.

Figure 5:
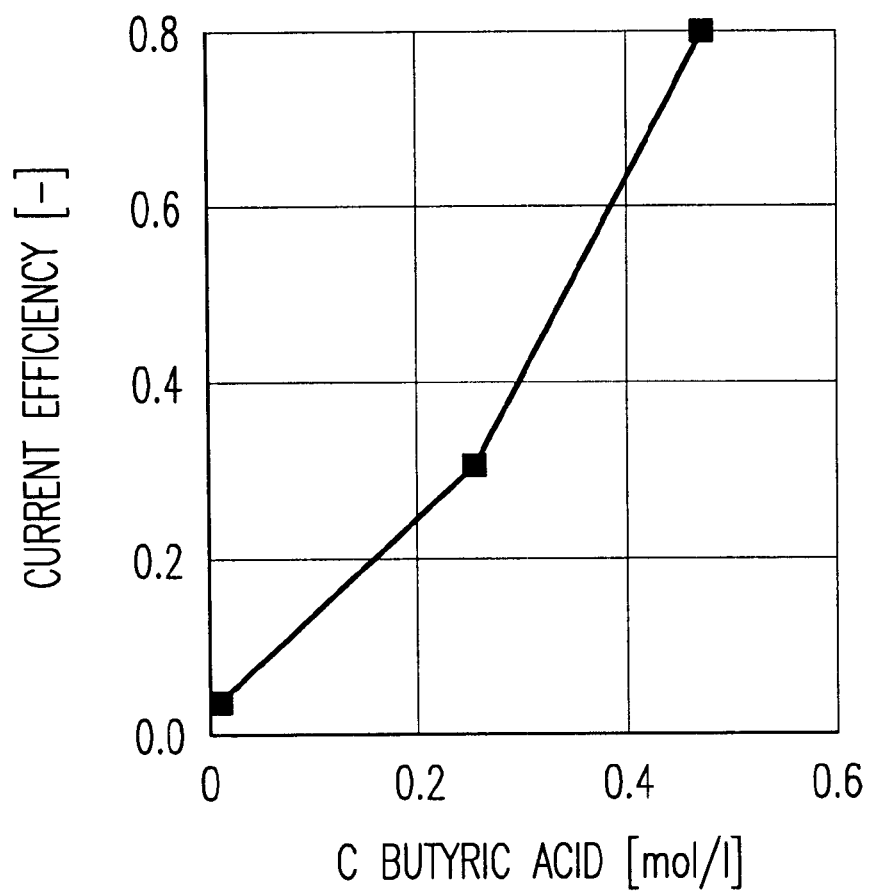
FIG. 5 is a plot of current efficiency versus butyric acid concentration in Example 2.

At relatively high butyric acid concentrations, the conductivity decreases, since the sodium hydroxide solution present in the reaction water is neutralized by the butyric acid. By neutralizing the base in the aqueous solution by increasing the acid concentration, preferably with the organic acids which are already present in the solution to be treated, the proportion of acid anions increases in comparison with the hydroxide anions. As a result, the organic acid can be transported through the ion-exchange membrane with higher selectivity, i.e. with higher current efficiency. The electric current is therefore principally transported by the acid anions. As result the current efficiency increases with greater addition of butyric acid to the reaction water circuit. In FIG. 5, the current efficiency is plotted against butyric acid concentration. The current efficiency increases with increasing butyric acid concentration.

The priority document of the present application, German patent application 198 49 924.8 filed Oct. 29, 1998, is incorporated herein by reference.

Obviously, additional modifications and variations of the present invention are possible in light of the above teachings. It is therefore to be understood that within the scope of the appended claims, the invention may be practiced otherwise than as specifically described herein.

What is claimed is:

1. The process of separating at least one first organic acid from an aqueous solution which is process water from an aldol condensation reaction, comprising:
    electrochemically treating said aqueous solution, wherein said electrochemical treating is electrolysis or electrodialysis and recovering purified process water.

2. The process of claim 1, wherein said treating is electrolysis in an electrolysis module, said electrolysis module having a cathode chamber and an anode chamber, said cathode chamber being separated from said anode chamber by at least one anion-exchange membrane.

3. The process of claim 2, wherein said electrolysis module comprises at least one electrode, comprising at least one member selected from the group consisting of steel, platinum black, graphite, a mixture of metal oxides, pure platinum, or a combination thereof.

4. The process of claim 1, wherein said treating is electrodialysis in an electrodialysis module,
    said electrodialysis module comprising:
        a cathode chamber;
        an anode chamber;
        a first solution chamber, between said cathode chamber and said anode chamber;
        a first receiving chamber, between said cathode chamber and said anode chamber, and closer to said anode chamber than said first solution chamber; and
        a first bipolar membrane, separating said first solution chamber and said first receiving chamber; and
    said treating of at least a portion of said aqueous solution takes place in said first receiving chamber.

5. The process of claim 4, wherein said electrodialysis module further comprises:
    a second solution chamber, between said cathode chamber and said anode chamber;
    a second receiving chamber, between said cathode chamber and said anode chamber, and closer to said anode chamber than said second solution chamber;
    a second bipolar membrane, separating said second solution chamber and said second receiving chamber; and a first anion exchange membrane, separating said first solution chamber and said second receiving chamber; and said treating of a portion of said aqueous solution takes place in said second receiving chamber.

6. The process of claim 5, further comprising adding a base to an acid solution, wherein said acid solution is introduced to said anode chamber and/or one or more of said receiving chambers.

7. The process of claim 6, wherein said process is a continuous process.

8. The process of claim 1, wherein one or more neutral organic compounds are separated from said aqueous solution.

9. The process of Claim 1, wherein said process is carried out at a temperature of from 20 to 140° C.

10. The process of claim 9, wherein said process is carried out at a temperature of from 30 to 60° C.

11. The process of claim 1, wherein said process is carried out with a current density of 50 to 1000 A/m$^2$.

12. The process of claim 1, wherein said process is a continuous process.

13. The process of claim 1, wherein said process is a batch process.

14. The process of claim 1, wherein at least said first organic acid or a different organic compound is split electrochemically in said anode chamber.

15. The process of claim 1, further comprising adding a second organic acid to said aqueous solution, wherein said aqueous solution comprises a base.

16. The process of claim 15, wherein said second organic acid is the same as said first organic acid.

17. A method of making a product aldehyde, comprising:

reacting a starting aldehyde in the presence of a base, to form said product aldehyde and an aqueous phase;

separating said product aldehyde and said aqueous phase; and separating at least one organic acid from said aqueous phase by the process comprising electrochemically treating said aqueous phase, wherein said electrochemical treatment is electrolysis or electrodialysis.

18. The method of claim 17, wherein said starting aldehyde is n-butyraldehyde, and said product aldehyde is ethylhex-2-enal.

19. A process for separating at least one first organic acid from an aqueous solution comprising:

electrochemically treating said aqueous solution, wherein said electrochemical treating is electrodialysis in an electrodialysis module, said electrodialysis module comprising:
a cathode chamber;
an anode chamber;
a first solution chamber, between said cathode chamber and said anode chamber;
a first receiving chamber, between said cathode chamber and said anode chamber, and closer to aid anode chamber than said first solution chamber; and
a first bipolar membrane, separating said first solution chamber and said first receiving chamber; and said treating of at least a portion of said aqueous solution takes place in said first receiving chamber, and wherein said electrodialysis module further comprises:
a second solution chamber, between said cathode chamber and said anode chamber;
a second receiving chamber, between said cathode chamber and said anode chamber, and closer to said anode chamber than said second solution chamber;
a second bipolar membrane, separating said second solution chamber and said second receiving chamber; and
a first anion exchange membrane, separating said first solution chamber and said second receiving chamber; and said treating of a portion of said aqueous solution takes place in said second receiving chamber.

* * * * *